(12) United States Patent
Takuma

(10) Patent No.: US 9,792,254 B2
(45) Date of Patent: Oct. 17, 2017

(54) COMPUTING INTERSECTION CARDINALITY

(71) Applicant: INTERNATIONAL BUSINESS MACHINES CORPORATION, Armonk, NY (US)

(72) Inventor: Daisuke Takuma, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 152 days.

(21) Appl. No.: 14/865,962

(22) Filed: Sep. 25, 2015

(65) Prior Publication Data
US 2017/0091146 A1    Mar. 30, 2017

(51) Int. Cl.
*G06F 17/10* (2006.01)
(52) U.S. Cl.
CPC ................... *G06F 17/10* (2013.01)
(58) Field of Classification Search
CPC .......................................... G06F 17/10
USPC ........................................ 708/300
See application file for complete search history.

(56) References Cited

U.S. PATENT DOCUMENTS

| | | | |
|---|---|---|---|
| 7,596,544 B2 | 9/2009 | Ganguly et al. | |
| 8,051,058 B2 | 11/2011 | Corvinelli et al. | |
| 2011/0246409 A1* | 10/2011 | Mitra | G06F 17/18 706/52 |
| 2011/0314045 A1 | 12/2011 | Koing et al. | |
| 2012/0158774 A1 | 6/2012 | Balkesen et al. | |
| 2012/0275666 A1* | 11/2012 | Gao | G06K 9/00677 382/118 |
| 2013/0304783 A1* | 11/2013 | Fontes | G06F 17/18 708/300 |

OTHER PUBLICATIONS

Bille, P. et al., "Fast evaluation of union-intersection expressions," Lecture Notes in Computer Science, vol. 4835, Dec. 2007. (pp. 1-12).
Ding, B. et al., "Fast Set Intersection in Memory," Proceedings of the VLDB Endowment, vol. 4 Issue 4, Jan. 2011. (pp. 255-266).

\* cited by examiner

*Primary Examiner* — Tan V. Mai
(74) *Attorney, Agent, or Firm* — Tutunjian & Bitetto, P.C.; Vazken Alexanian

(57) ABSTRACT

A computer-implemented method for computing an intersection or an intersection cardinality of each pair of a set in a first list of a plurality of sets and a set in a second list of a plurality of sets, the method including calculating a first union of a predetermined number of sets in the first list, obtaining filtered sets of the second list by filtering out an element from the plurality of sets in the second list, the element being not included in the first union, and intersecting a set in the first list and a set in the filtered sets of the second list.

13 Claims, 13 Drawing Sheets

| SECOND LIST / FIRST LIST | PRODUCT 1 (B₁) | PRODUCT 2 (B₂) | PRODUCT 3 (B₃) | PRODUCT 4 (B₄) | ... |
|---|---|---|---|---|---|
| EXPENSIVE (C₁) | 351 | 53 | 45 | 120 | ... |
| LATE (C₂) | 215 | 239 | 121 | 152 | ... |
| DAMAGE (C₃) | 80 | 36 | 210 | 279 | ... |
| ... | ... | ... | ... | ... | ... |

FIG. 2

| D | $C_1$ | $C_2$ | $C_3$ | C | $B_1$ | $B^*_1$ $(=C \cap B_1)$ |
|---|---|---|---|---|---|---|
| 1 | × | × |   | × | × | × |
| 2 | × |   |   | × |   |   |
| 3 |   |   |   |   | ⊗ |   |
| 4 |   | × |   | × |   |   |
| 5 | × | × | × | × |   |   |
| 6 |   |   |   |   | ⊗ |   |
| 7 | × |   |   | × | × | × |
| 8 | × | × | × | × |   |   |
| 9 |   |   | × | × |   |   |
| 10 |   |   |   |   | ⊗ |   |

FIG. 3

| FIRST LIST \ SECOND LIST | $B_1$ | $B_2$ | ... | $B_N$ |
|---|---|---|---|---|
| $C_1$ | $\|C_1 \cap B_1\|$ | $\|C_1 \cap B_2\|$ | ... | $\|C_1 \cap B_N\|$ |
| ... | ... | ... | ... | ... |
| $C_{i[1]}$ | $\|C_{i[1]} \cap B_1\|$ | $\|C_{i[1]} \cap B_2\|$ | ... | $\|C_{i[1]} \cap B_N\|$ |
| ... | ... | ... | ... | ... |
| $C_{i[g-1]+1}$ | $\|C_{i[g-1]+1} \cap B_1\|$ | $\|C_{i[g-1]+1} \cap B_2\|$ | ... | $\|C_{i[g-1]+1} \cap B_N\|$ |
| ... | ... | ... | ... | ... |
| $C_{i[g]}$ | $\|C_{i[g]} \cap B_1\|$ | $\|C_{i[g]} \cap B_2\|$ | ... | $\|C_{i[g]} \cap B_N\|$ |
| ... | ... | ... | ... | ... |

Rows $C_1$ through $C_{i[1]}$ form the 1st group; rows $C_{i[g-1]+1}$ through $C_{i[g]}$ form the g-th group.

FIG. 4A

| SECOND LIST \ FIRST LIST | $B_1$ | ... | $B_N$ |
|---|---|---|---|
| | $B^*_1$ ($=A \cap B_1$) | ... | $B^*_N$ ($=A \cap B_N$) |
| $A^*_1$ ($=A_1 \cap B$) | $|A^*_1 \cap B^*_1|$ | ... | $|A^*_1 \cap B^*_N|$ |
| ... | ... | ... | ... |
| $A^*_M$ ($=A_M \cap B$) | $|A^*_M \cap B^*_1|$ | ... | $|A^*_M \cap B^*_N|$ |
| $A_1$ | | | |
| ... | | | |
| $A_M$ | | | |

FIG. 6

| SECOND LIST / FIRST LIST | $B_1$ | ... | $B_N$ |
|---|---|---|---|
| $C_1$ | $|C_1 \cap B_1|$ | ... | $|C_1 \cap B_N|$ |
| ⋮ | ⋮ | ⋮ | ⋮ |
| $C_J$ | $|C_J \cap B_1|$ | ⋮ | $|C_J \cap B_N|$ |
| ⋮ | ⋮ | ⋮ | ⋮ |
| $C_P$ | $|C_P \cap B_1|$ | ⋮ | $|C_P \cap B_N|$ |
| ⋮ | ⋮ | ⋮ | ⋮ |
| ⋮ | ⋮ | ⋮ | ⋮ |
| ⋮ | ⋮ | ⋮ | ⋮ |
| $C_Q$ | $|C_Q \cap B_1|$ | ... | $|C_Q \cap B_N|$ |

Rows $C_1 \ldots C_J$: 1st group; Rows $C_P \ldots C_Q$: h-th group

FIG. 8

COMPUTING INTERSECTION CARDINALITY

BACKGROUND

Technical Field

The present invention relates to a method for computing an intersection cardinality, and more specifically, to a method for computing an intersection or an intersection cardinality of each pair of a set in a first list including plural sets and a set in a second list including plural sets. The present invention is typically used for analyzing text data

SUMMARY

According to an embodiment of the present invention, there is provided a computer-implemented method for computing an intersection or an intersection cardinality of each pair of a set in a first list of a plurality of sets and a set in a second list of a plurality of sets. The method calculates a first union of a predetermined number of sets in the first list. The method obtains filtered sets of the second list by filtering out an element from the plurality of sets in the second list, the element being not included in the first union. The method intersects a set in the first list and a set in the filtered sets of the second list.

According to another embodiment of the present invention, there is provided a computer-implemented method for computing an intersection or an intersection cardinality of each pair of a set in a first list of a plurality of sets and a set in a second list of a plurality of sets. The method calculates a first union of a predetermined number of sets in the first list. The method obtains filtered sets of the second list by filtering out an element from the plurality of sets in the second list, the element being not included in the first union. The method calculates a second union of a predetermined number of sets in the second list. The method obtains filtered sets of the first list by filtering out an element from the plurality of sets in the first list, the element being not included in the second union. The method intersects a set in the filtered sets of the first list and a set in the filtered sets of the second list.

According to still another embodiment of the present invention, there is provided a system for computing an intersection or an intersection cardinality of each pair of a set in a first list of a plurality of sets and a set in a second list of a plurality of sets. The system includes a processor and a memory coupled to the processor. The memory includes instructions which, when executed by the processor, cause the processor to calculate a first union of a predetermined number of sets in the first list. The instructions further cause the processor to obtain filtered sets of the second list by filtering out an element from the plurality of sets in the second list, the element being not included in the first union. The instructions further cause the processor to intersect a set in the first list and a set in the filtered sets of the second list.

According to yet another embodiment of the present invention, there is provided a computer program product for computing an intersection or an intersection cardinality of each pair of a set in a first list of a plurality of sets and a set in a second list of a plurality of sets. The computer program product includes a computer readable storage medium having program instructions embodied with the computer readable storage medium. The program instructions are executable by a computer to cause the computer to calculate a first union of a predetermined number of sets in the first list. The program instructions are executable by a computer to further cause the computer to obtain filtered sets of the second list by filtering out an element from the plurality of sets in the second list, the element being not included in the first union. The program instructions are executable by a computer to further cause the computer to intersect a set in the first list and a set in the filtered sets of the second list.

BRIEF DESCRIPTION OF THE DRAWINGS

FIG. 2 is a table showing correlation analysis according to the embodiment.

FIG. 3 is a table illustrating a calculation for correlation analysis of target words.

FIGS. 4A and 4B are tables showing correlation analysis according to the embodiment.

FIG. 6 is a table showing correlation analysis according to a second embodiment.

FIG. 8 is a table showing correlation analysis according to a third embodiment.

DETAILED DESCRIPTION

Hereinafter, embodiments of the present invention will be described in detail with reference to the attached drawings.

It is to be noted that the present invention is not limited to these embodiments given below and may be implemented with various modifications within the scope of the present invention. In addition, the drawings used herein are for purposes of illustration.

Figure 1:
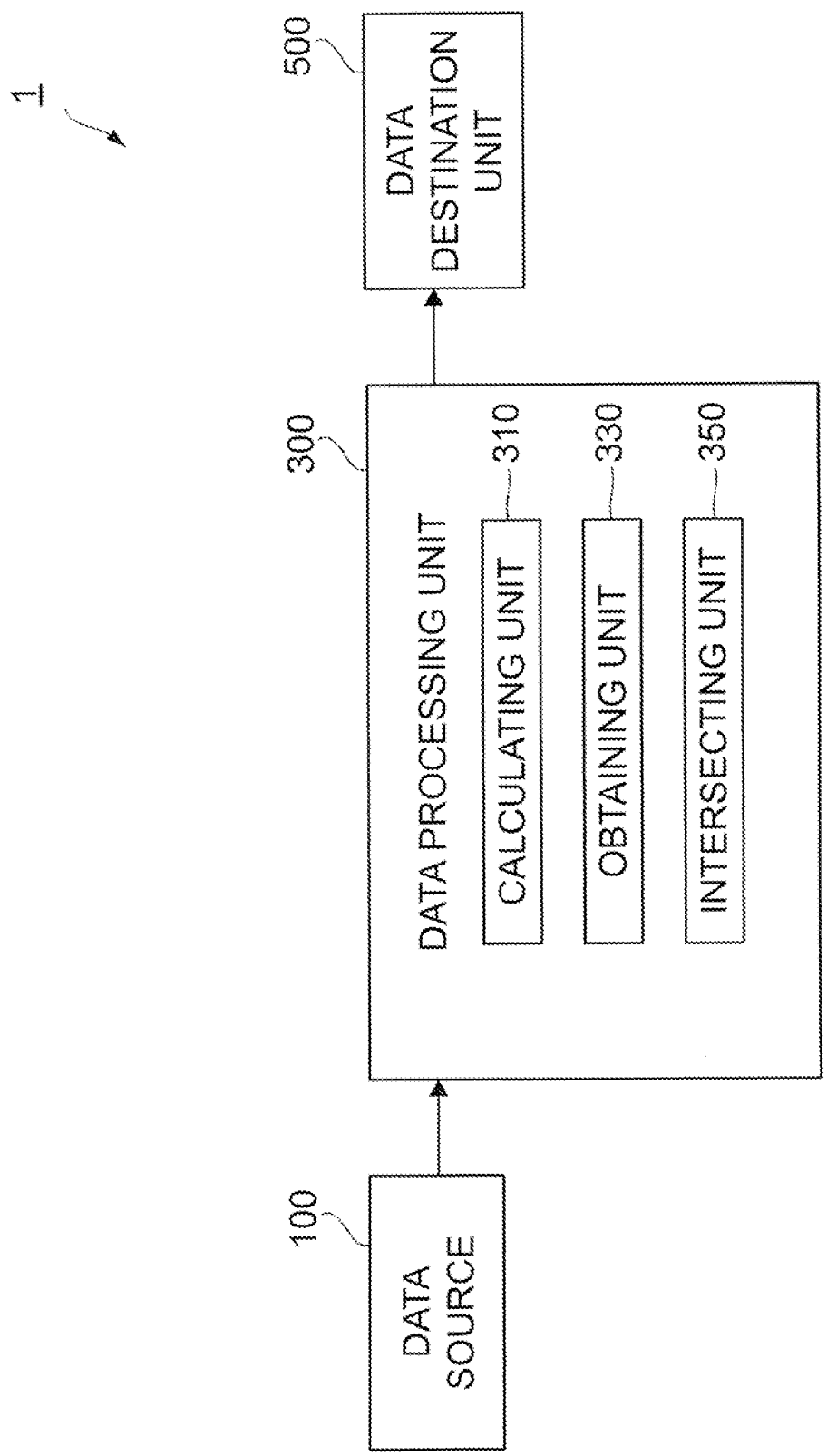
FIG. 1 is a block diagram showing a computer system according to an embodiment.

FIG. 1 is a block diagram of a computer system 1 according to an embodiment. The computer system 1 performs an intersection or an intersection cardinality of each pair of a set in a first list of a plurality of sets and a set in a second list of a plurality of sets. As shown in FIG. 1, the computer system 1 may include a data source 100, a data processing unit 300, and a data destination unit 500.

The data source 100 generates text data to be processed by the data processing unit 300. For example, the data source 100 generates text data based on microblogging data on the Internet, or based on voice data of conversations between customers and operators in a call center. In the present embodiment, the data source 100 generates (stores) text data that include multiple text datasets, namely multiple documents. In other words, the data source 100 generates a set of documents. Such a set of documents may be a universal set, in this embodiment.

The data processing unit 300 may include a calculating unit 310, an obtaining unit 330, and an intersecting unit 350. These control blocks may be programmed to be performed by a central processing unit (CPU).

The calculating unit 310 receives text data from the data source 100 to calculate a union, namely to determine a sum, of multiple sets included in a specific list. In other words, the calculating unit 310 stores the first list, and calculates the first union of sets in the first list. The first list will be described later.

The obtaining unit 330 filters out a specific element(s) from sets in a specific list. In other words, the obtaining unit 330 stores the second list and filters out a specific element(s) from the sets in the second list to obtain the filtered second list. The second list and the filtered second list will be described later.

The intersecting unit 350 intersects a set in the first list and a set in the filtered second list. In other words, the intersecting unit 350 computes the intersection cardinality of each set of the first list and each set of the filtered second list.

The data destination unit 500 is a recipient of the results of the data processing by the data processing unit 300.

With the expansion of information processing technology, large amounts of diverse text data have recently been analyzed for new findings in a wide variety of fields. Examples include the analysis of microblogging data, and voice data at a call center (hereinafter referred to as "call center data").

Various approaches have been proposed for analyzing text data, such as text mining, which is a process of deriving findings from the text data. In the present embodiment, a correlation analysis between two words is carried out, as one example of such approaches.

Hereinafter, the correlation analysis in the present embodiment will be described in detail.

FIG. 2 is a table showing correlation analysis according to the embodiment. More specifically, the table of FIG. 2 shows a correlation of words included in call center data.

The call center data includes multiple text datasets (documents). Each document includes the text of the conversation between a customer and an operator. More specifically, each document is related to a customer feedback regarding specific products (e.g. Product 1 to Product 4 in FIG. 2).

In this embodiment, the documents are respectively listed in the first list and the second list. Each of the first list and the second list is a list of sets, and each set consists of the documents having a target word. Here, the target word is a word (term) selected for the correlation analysis. In other words, the target word is a word that has a possibility of being included in the above multiple documents.

As shown in FIG. 2, the first list includes the sets of the documents respectively labeled with the target words, "Expensive" ($C_1$), "Late" ($C_2$), and "Damage" ($C_3$). Similarly, the second list includes the sets respectively labeled with the target words, "Product 1" ($B_1$), "Product 2" ($B_2$), "Product 3" ($B_3$), and "Product 4" ($B_4$). Note that "$C_1$", "$C_2$", "$C_3$", "$B_1$", "$B_2$", "$B_3$" may be used in the following explanation, including other embodiments.

Here, the set $C_1$ is a subset consisting of the documents which include the target word "Expensive". The set $C_1$ may be obtained by $C_1$={Hit doc IDs of "Expensive"}. Similarly, each of the sets $C_2$, $C_3$, $B_1$, $B_2$, $B_3$ and $B_4$ is a subset consisting of the documents which include the target word "Late", "Damage", "Product 1", "Product 2", "Product 3", and "Product 4", respectively. It is to be noted that the sets $C_1$ to $C_3$ and the sets $B_1$ to $B_4$ are included in one universal set in this example.

Here, the target words of the first list and the second list may be selected by a user of the computer system 1. It is to be noted that the target words to be selected are not limited to those in the embodiment, and any word may be selected as the target word. For example, the target word may be selected based on the appearance frequency of the word in the call center data.

The intersection size of each pair of one set from the first list and one set from the second list is computed in the correlation analysis. As shown in FIG. 2, each cell of the table shows the intersection cardinality, namely hit count for the AND search query of the vertical and horizontal words. All cells in the table i.e. intersection sizes of all combinations of the sets in the first list and the sets in the second list may be calculated.

The degree of correlation of the target words is determined based on the count size of the intersection cardinality. For example, the count is compared with a predetermined number to determine whether the target words are found to have a strong correlation.

Here, the intersection cardinality is calculated by $|C_k \cap B_n|$ for each pair of $C_k$ (k=1, 2, ..., K, K≥2) and $B_n$ (n=1, 2, ..., N, N≥2). For example, in FIG. 2, the intersection cardinality of the set $C_1$ and the set $B_1$, as denoted by $|C_1 \cap B_1|$, is 351. In other words, the count size of the documents including the target words "Expensive" and "Product 1" is 351. Note that "$C_k$" and "$B_n$" may be used in the following explanation, including other embodiments.

It is to be noted that $|C_k \cap B_n| = |(C_k \cap C) \cap B_n| = |C_k \cap (C \cap B_n)| = |C_k \cap B^*_n|$. "C" is calculated by $\cup_{k=1-K} C_k$. In the example of FIG. 2, "C" is a union of $C_1$ to $C_3$, i.e. $C = C_1 \cup C_2 \cup C_3$. "$B^*_n$" represents a filtered set obtained from the set $B_n$. Note that "C" and "$B^*_n$" may be used in the following explanation, including other embodiments.

Here, the set $B^*_n$ is obtained by filtering out one or more elements (documents) which are not included in the union C, from the set $B_n$ and this filtering is performed by calculating $C \cap B_n$. In this embodiment, such one or more filtered sets $B^*_n$ (n=1, 2, ..., N, N≥2) constitute a filtered list (i.e. the filtered second list). That is, the filtered list is composed of one or more sets $B^*_n$ each including the remaining element(s) after eliminating the element(s) which is not included in the union C. In other words, the filtered list is composed of one or more sets $B^*_n$ each only including the element(s) which is in common with the element(s) included in the union C.

In the present embodiment, $|C_k \cap B^*_n|$ is calculated, instead of $|C_k \cap B_n|$. The calculation of $|C_k \cap B^*_n|$ enables to reduce a calculation load as compared to the calculation of $|C_k \cap B_n|$. Hereinafter, an example of the reduction in the calculation load will be described referring to FIG. 3.

Figure 3:
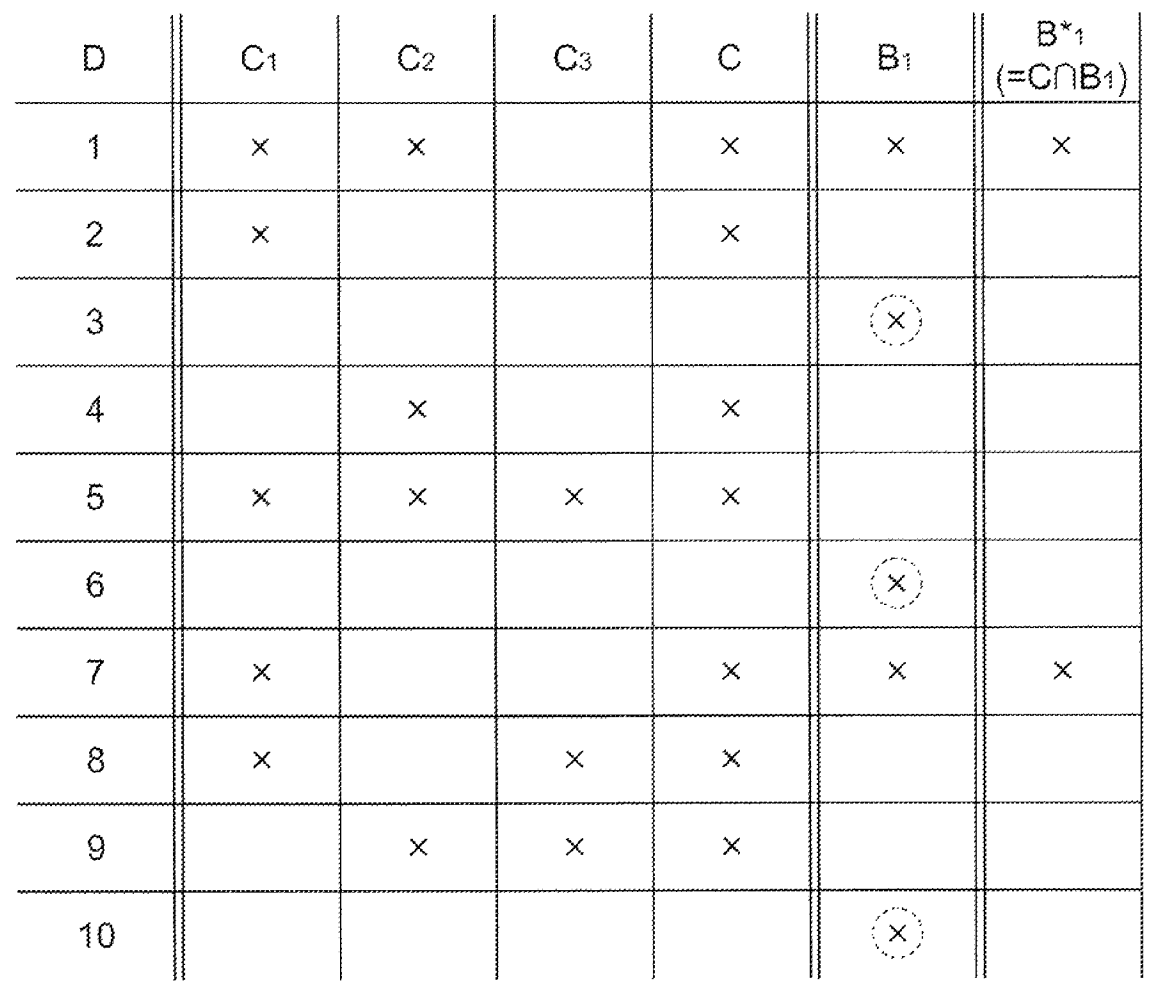

FIG. 3 is a table illustrating a calculation for correlation analysis of target words. In the table of FIG. 3, "D" represents the universal set consisting of Document 1 to Document 10. Documents 1 to 10 are examples of the documents generated by the data source 100. It is to be noted that "D" is a set of document IDs.

In FIG. 3, "$B^*_1$", which is an example of the filtered sets of the second list, represents the filtered set obtained from the set $B_1$. "$B^*_1$" is calculated by $C \cap B_1$, as shown in FIG. 3. Further, the cross mark in each cell in FIG. 3 indicates that the target word is included in any one of Documents 1 to 10.

If the calculation of $|C_k \cap B_1|$ is applied, the calculations for Documents 1, 3, 6, 7 and 10 are carried out. However, if the calculation of $|C_k \cap B^*_1|$ is applied, the calculations for only Documents 1 and 7 are carried out. In other words, the calculations for Documents 3, 6 and 10 (indicated by the cross marks circled with dotted line) can be omitted by applying the calculation of $|C_k \cap B^*_1|$, in this example. This enables to reduce the calculation load, or enables to quickly calculate the intersection cardinality.

Figure 4B:
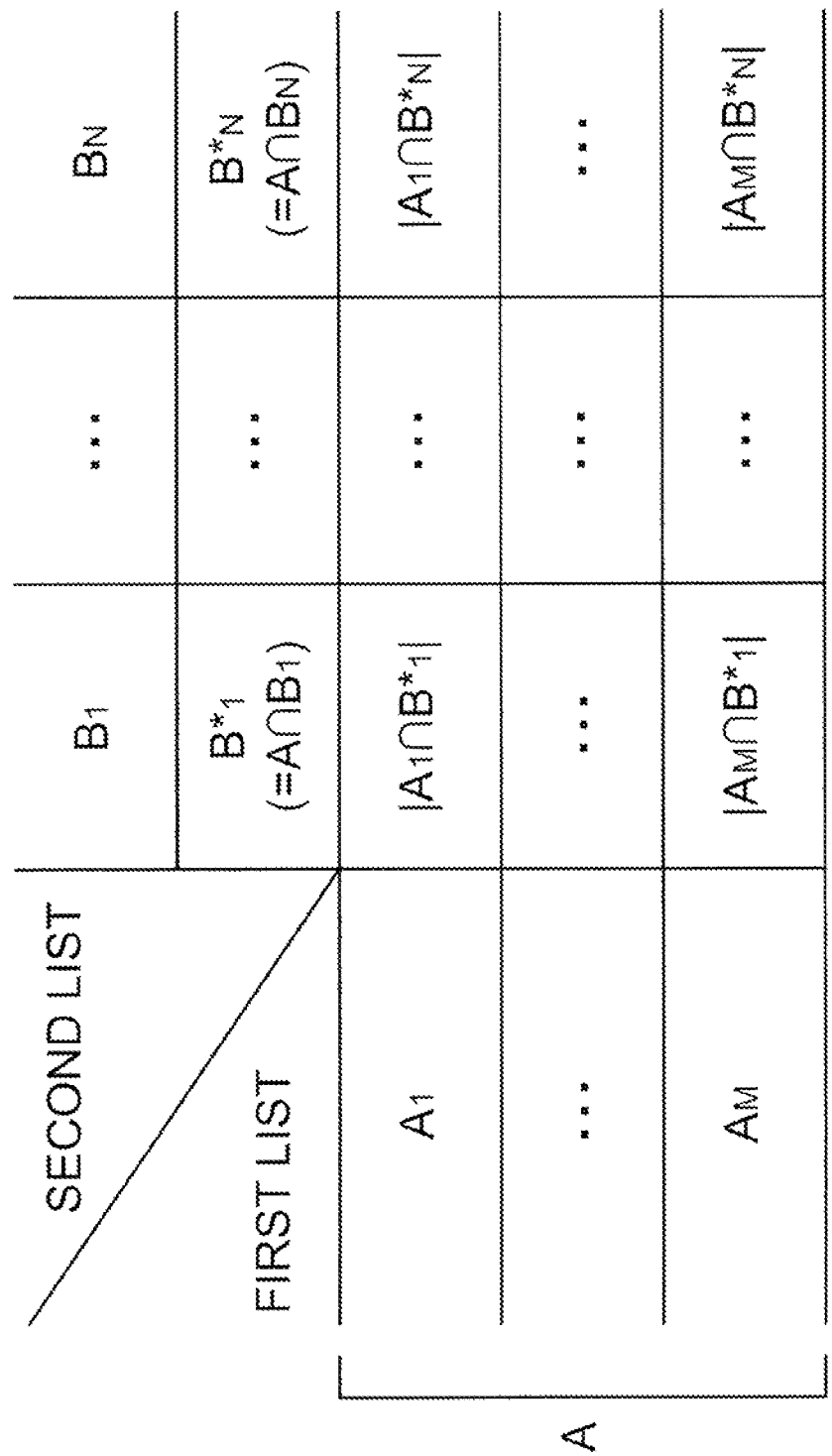

FIGS. 4A and 4B are tables showing correlation analysis according to the embodiment. Hereinafter, the detailed process for the correlation analysis will be described with reference to FIGS. 4A and 4B.

In the example of FIG. 4A, the sets in the first list are sorted in order of size (i.e. the number of the documents contained in each set), more specifically, $|C_1| \geq |C_2| \geq \ldots \geq |C_K|$. Similarly, the sets in the second list are sorted in order of size, more specifically, $|B_1| \geq |B_2| \geq \ldots \geq |B_N|$.

In the present example, the correlation analysis is carried out according to the following calculations (1) to (4).

(1) The sets $C_k$ (k=1, 2, . . . , K) in the first list are divided into G groups $(C_1, \ldots, C_{i[1]}), (C_{i[1]+1}, \ldots, C_{i[2]}), \ldots, (C_{i[G-1]+1}, \ldots, C_{i[G]})$, where (i[0]=0, i[G]=K, i[g]>i[g−1] for g=1, . . . , G). The size of g-th group i[g]−i[g−1] will be described later.

Hereinafter, one divided group of $C_{i[g-1]+1}, \ldots C_{i[g]}$ is denoted by the divided group A of the sets $A_1, \ldots, A_M$, as shown in FIG. 4B. The calculation for the correlation analysis of the sets $(A_1, \ldots, A_M)$ in the divided group A and the sets $(B_1, \ldots, B_N)$ in the second list will be explained below.

(2) The first union is calculated. The first union is a union of plural sets in the divided group A and may be calculated by $A = \cup_{m=1 \sim M} A_m$.

(3) The filtered sets $B^*_1, B^*_2, \ldots, B^*_n$ in the second list are computed by $A \cap B_n$ (n=1, . . . , N). More specifically, the specific element(s) is filtered out from the sets in the second list.

(4) The intersection cardinality is computed. More specifically, the intersection cardinality of each set in the divided group A in the first list and each set in the second filtered list is calculated by $|A_m \cap B^*_n|$.

It is to be noted that the above calculation (2) takes time to calculate $|D|/w$ and $\Sigma_{m=1 \sim M} |A_m|$, where $|D|$ represents the number of elements in the universal set D consisting of Document 1 to Document 10 in this example, and "w" represents the machine word length, i.e. digitized capability of the CPU. The time of the calculation (2) is proportional to M. Similarly, the above calculation (3) takes time to calculate $\Sigma_{n=1 \sim N} |B_n|$, and the time of calculation (3) is proportional to N.

Thus, the calculations (2) and (3) may be overhead. However, the calculations (2) and (3) are one-time cost for all $B_1, \ldots, B_N$, to reduce their size by $|A|/|D|$, which accelerates the computation for all M×N pairs.

Hereinafter, an implementation and a time complexity for the calculations (2), (3), and (4) will be described. It is to be noted that a constant is omitted in the following explanation.

First, the calculation (2) may include calculations (2-A), (2-B), and (2-C). The calculation (2-A) is to create bit sets for $A_1, \ldots, A_M$. The time complexity of the calculation (2-A) may be calculated by $M|D|/w$. The calculation (2-B) is to put values of $A_1, \ldots, A_M$. The time complexity of the calculation (2-B) may be calculated by $\Sigma_{m=1 \sim M} |A_m|$. The calculation (2-C) is to get $\cup_{m=1 \sim M} A_m$ by bit-wise OR. The time complexity of calculation (2-C) may be calculated by $M|D|/w$.

Similarly, the calculation (3) is to compute $B^*_n = A \cap B_n$ (n=1, . . . , N). The time complexity of the calculation (3) may be calculated by $\Sigma_{n=1 \sim N} |B_n|$. The calculation (4) is to compute $|A_m \cap B^*_n|$. The time complexity of the calculation (4) may be calculated by $M \Sigma_{n=1 \sim N} |B^*_n|$, and approximated by $M \Sigma_{n=1 \sim N} |B_n| |A|/|D|$.

Here, provided that $a=|A_1|$, $b=|B_1|$, $\alpha, \beta, \gamma, \delta > 0$, the time for $A_m \cap B_n$ is $T(M) \leq \alpha |D|/(Nw) + \beta a/N + \gamma b/M + \delta abM/|D|$.

The right side of the equation takes its minimum $\alpha|D|/(Nw) + \beta a/N + 2(\gamma \delta)^{1/2}(a/|D|)^{1/2}b$ at $M = (\gamma/\delta)^{1/2}(|D|/a)^{1/2}$. Practically, $2(\gamma\delta)^{1/2}(a/|D|)^{1/2}b$ is dominant (Java), and $a/|D|$ can be seen as an improvement factor (acceleration factor).

Here, the group size of the g-th group i[g]−i[g−1] will be described. The group size of the g-th group i.e. the number of the sets included in the g-th group may be any number. In the present embodiment, the group size of the g-th group, or the combination of plural sets for the computation of the first union is selected such that the expected size of a union of all sets in the g-th group (e.g. the size of g-th group i[g]−i[g−1]) is sufficiently smaller than the number of elements in the universal set (e.g. $|D|$), and sufficiently larger than the size of each set in the g-th group (e.g. $|C_{i[g-1]+1}|$). In other words, the expected size of a union of all sets in the g-th group may be determined based on the number of elements in the universal set and the size of each set in the g-th group.

Here, in the present embodiment, the group size is selected such that the group size is proportional to $(|D|/|C_{i[g-1]+1}|)^{1/2}$. In other words, the combination of plural sets for the computation of the first union is selected such that the number of the sets is proportional to the inverse of the square root of the size ratio of the representative value of the sizes of the sets ($|C_{i[g-1]+1}|$) to the number of elements in the universal set ($|D|$). In other words, the number of elements in the universal set corresponds to the number of all possible elements of each set. Note that the set in the g-th group is a subset of the universal set D so that the elements of the universal set D have a possibility of constituting the set in the g-th group. Namely, the element in the universal set is a possible element of each set.

It is to be noted that the division of the first list $C_k$ (k=1, 2, . . . , K) into G groups enables a reduction of a distribution of $A_1$ to $A_M$ and thus an appropriate size of the union can be obtained. However, such division can be omitted. In other words, the first union may be composed of all sets included in the first list. Further, in the above description, $C_{i[g-1]+1}$, which is the largest in the g-th group, is selected as the representative vale of the size of the target group (the g-th group in the above example). Alternatively, an average of the g-th group, or other values may be selected as such representative value.

Figure 5:
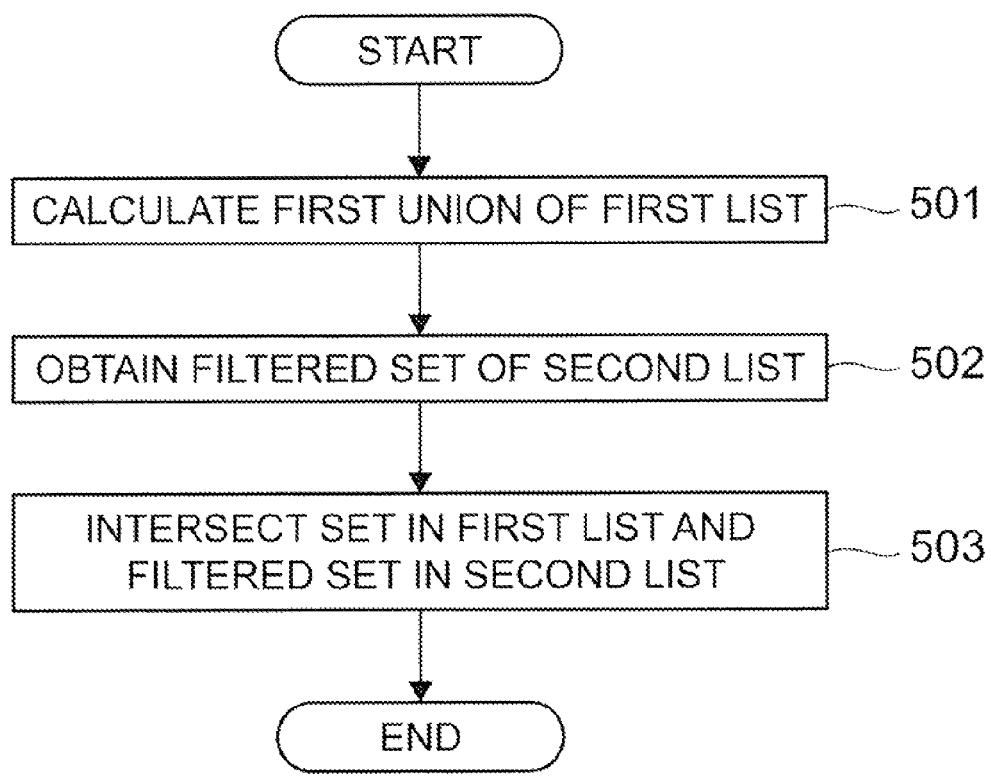
FIG. 5 is a flowchart of the operation of a data processing unit for correlation analysis according to the embodiment.

FIG. 5 is a flowchart of the operation of the data processing unit 300 for correlation analysis according to the embodiment. Hereinafter, the operation of the data processing unit 300 for the correlation analysis will be described with reference to FIG. 5.

In the present example, the calculating unit 310 calculates the first union of a predetermined number of sets in the first list (step 501). Then, the obtaining unit 330 obtains filtered sets of the second list by filtering out one or more elements from the plurality of sets in the second list (step 502). Wherein, the one or more elements are elements not included in the first union. Subsequently, the intersecting unit 350 intersects each set in the first list and each set in the filtered sets in the second list obtained by the obtaining unit 330 (step 503).

Hereinafter, the operation for the correlation analysis according to another embodiment (second embodiment) will be described with reference to FIG. 6. FIG. 6 is a table showing correlation analysis according to a second embodiment.

In the first embodiment, the calculation using one filtered list (the second filtered list) for the correlation analysis is conducted. This algorithm may be called a "horizontal filtering". On the other hand, the calculation using a combination of filtered lists is conducted in the second embodiment. More specifically, in addition to the calculation of $B^*_n$, filtered sets $A^*_m$ are also calculated. The filtered sets $A^*_m$ are examples of the filtered sets of the first list. Hereinafter this algorithm may be called a "block filtering".

The calculation of the second embodiment is basically the same as the above calculations (1) to (3) of the first embodiment.

However, in the calculation (1), the sets in the second list may also be divided into plural groups. It is to be noted that the division can be omitted.

Further, instead of the above calculation (4) of the first embodiment, the following calculations (5), (6), and (7) are conducted.

The calculation (5) is to compute "the second union" of plural sets in the second list by $B=\cup_{n=1\sim N} B^*_n$. The calculation (6) is to filter out the element(s) which is not included in the second union from plural sets in the first list. More specifically, the calculation (6) computes the filtered sets $A^*_m = A_m \cap B$ (m=1, ..., M). The calculation (7) is to return $|A^*_m \cap B^*_n|$.

Figure 7:
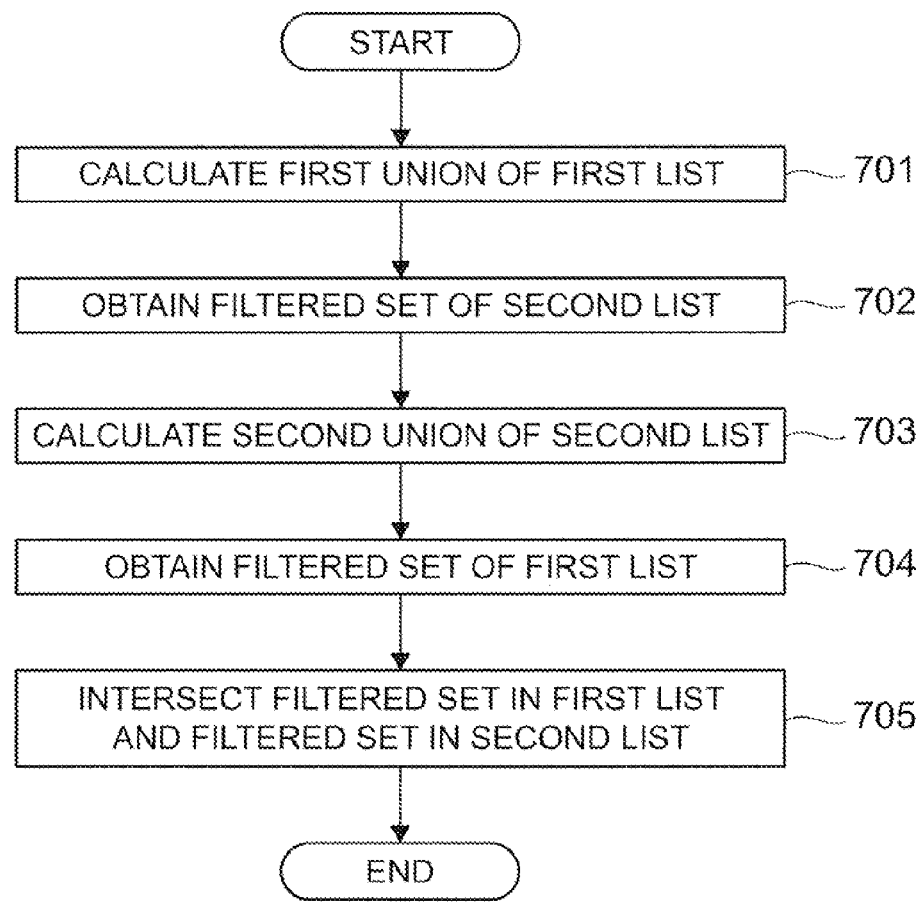
FIG. 7 is a flowchart of the operation of a data processing unit according to the second embodiment.

Then, the operation of the data processing unit 300 in the second embodiment will be described with reference to FIG. 7. FIG. 7 is a flowchart of the operation of the data processing unit 300 according to the second embodiment.

In the present embodiment, the calculating unit 310 calculates the first union of a predetermined number of sets in the first list (step 701). The obtaining unit 330 obtains filtered sets of the second list by filtering out one or more elements element from the plurality of sets in the second list (step 702). Wherein, the one or more elements are elements not included in the first union. Then, the calculating unit 310 calculates the second union of a predetermined number of sets in the second list (step 703). Subsequently, the obtaining unit 330 obtains filtered sets of the first list by filtering out one or more elements from the plurality of sets in the first list (step 704). Wherein, the one or more elements are elements not included in the second union. Then, the intersecting unit 350 intersects the filtered sets in the first list and the filtered sets in the second list obtained by the obtaining unit 330 (step 705).

In the above description, the horizontal filtering and the block filtering for the correlation analysis have been explained. It is to be noted that the algorithm for the correlation analysis may be changed based on a property of the text data. For example, the applied algorithm may be switched based on the size of the first list and the second list.

Hereinafter, the operation for the correlation analysis according to still another embodiment (third embodiment) will be described with reference to FIG. 8. FIG. 8 is a table showing correlation analysis according to the third embodiment.

As shown in FIG. 8, the first list is divided into several groups, including the first group ($C_1, \ldots, C_J$) and the h-th group ($C_P, \ldots, C_Q$). In the third embodiment, depending on the number of the sets included in each group, i.e. group size $M_g$, the algorithm is selected from the horizontal filtering, the block filtering and BitSet method. BitSet method is to intersect each element (each cell of the table) in $C_k$ with a bitset (set) of $B_n$. Here, the bitset is a series of bits in the memory, and each bit corresponds to the element of $B_n$.

In the third embodiment, if the group size $M_g$ of a target group (e.g. the first group, the h-th group) of the first list is small (e.g. $M_g=2$), or smaller than a predetermined number, BitSet method is carried out. On the other hand, if the group size $M_g$ of the target group is large, or larger than a predetermined number, the horizontal filtering or the block filtering is carried out.

Similarly, the algorithm may be selected from the horizontal filtering and the block filtering, depending on the group size $N_g$ of the group of the second list. More specifically, if the group size $N_g$ of a group of the second list is small, or smaller than a predetermined number, the horizontal filtering is carried out. If the group size $N_g$ of the target group is large, or larger than a predetermined number, the block filtering is carried out.

Here, the parameters $M_g$ and $N_g$ may be calculated by $M_g = 0.5 |D|/|A_1|^{1/2}$, and $N_g = 0.5 |D|/|B_1|^{1/2}$. For example, the above predetermined number (threshold) for $M_g$ for switching the algorithms may be set to 4. Also, the predetermined number (threshold) for $N_g$ may be set to 10. In this example, if $M_g < 4$, BitSet method may be selected, if $M_g \geq 4$ and $N_g < 10$, the horizontal filtering may be selected, and if $M_g \geq 4$ and $N_g \geq 10$, the block filtering may be selected.

It is to be noted that if the combination that is appropriate for computing the union cannot be found, the horizontal filtering (or block filtering) may not be selected, or may be prohibited from being selected. An example of such appropriate combination is that the expected size of the union of the combination is sufficiently smaller than the number of all the possible elements and sufficiently larger than the size of each set.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
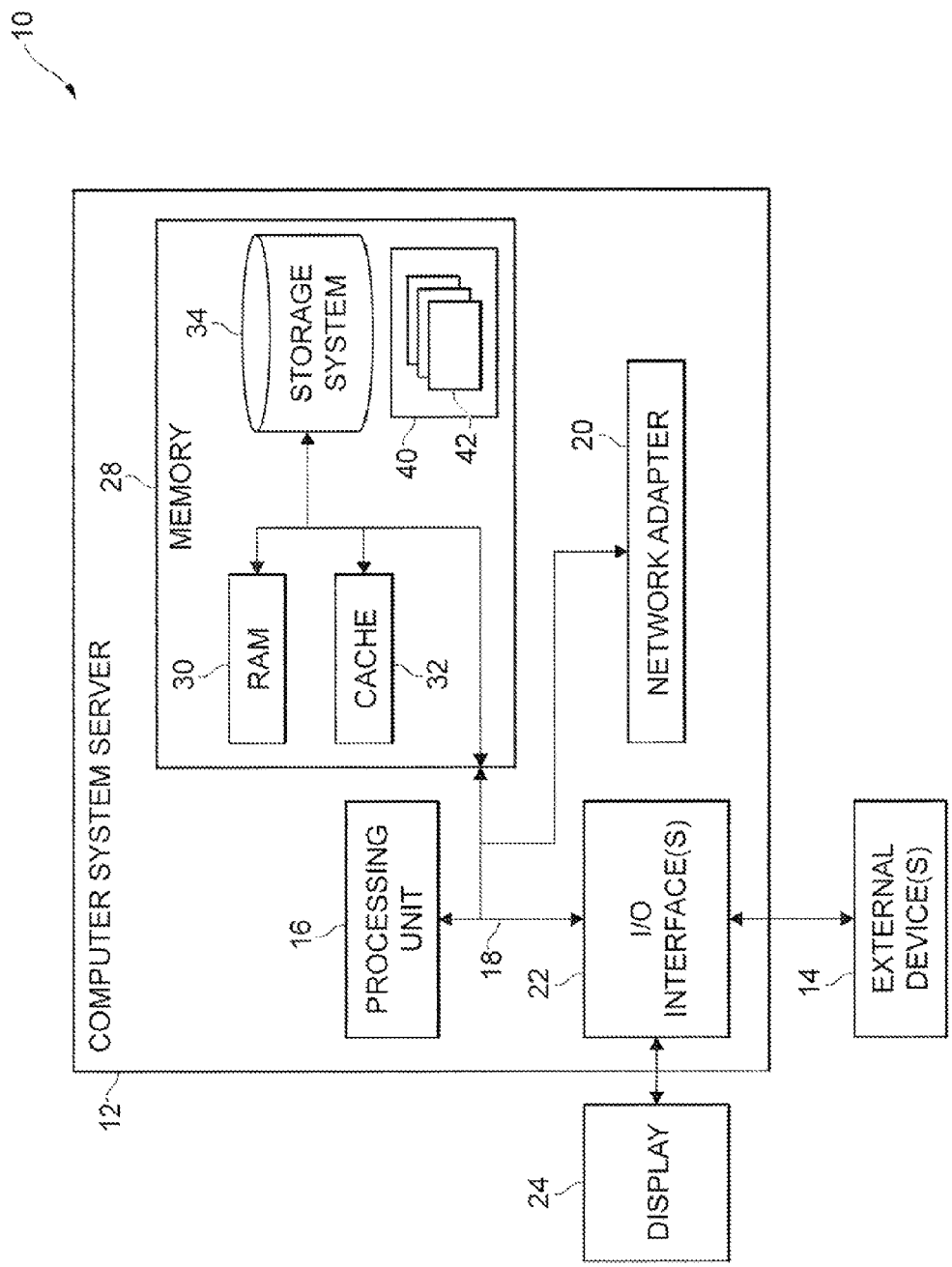
FIG. 9 depicts a cloud computing node according to an embodiment.

Referring now to FIG. 9, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 10:
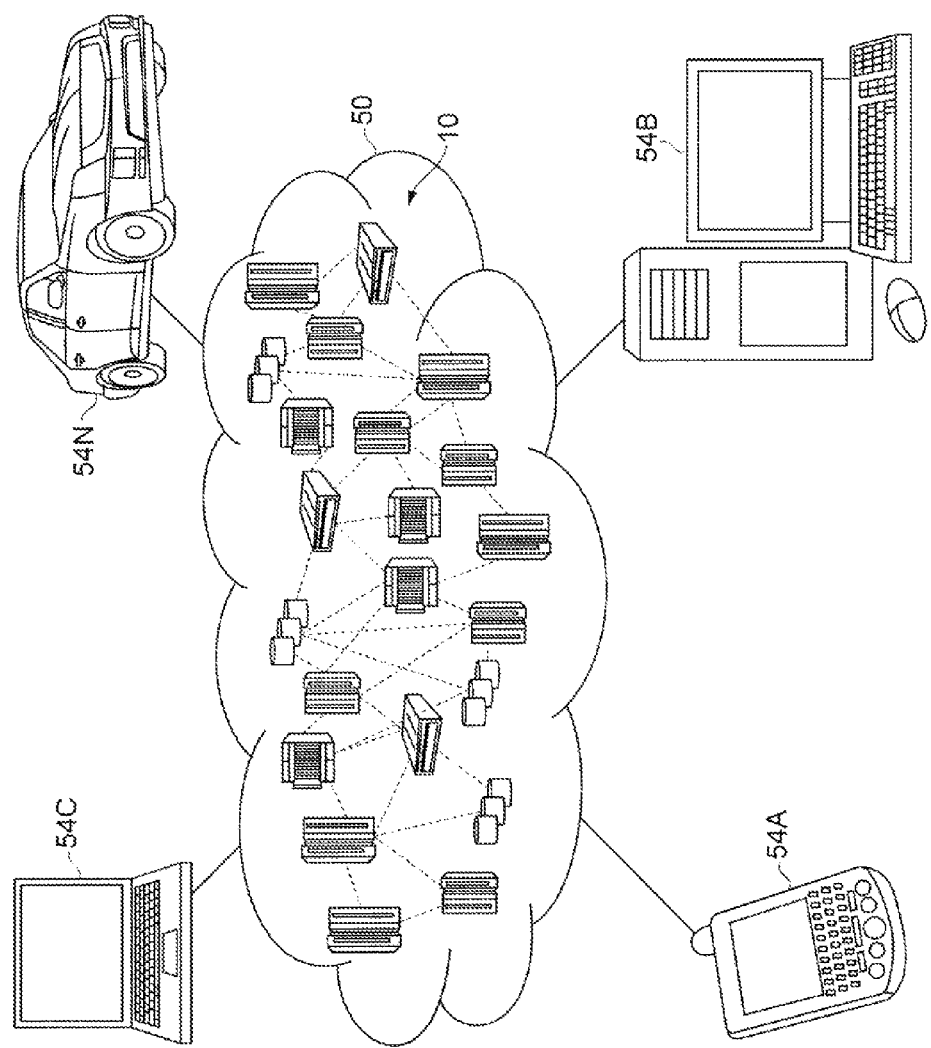
FIG. 10 depicts a cloud computing environment according to an embodiment.

Referring now to FIG. 10, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
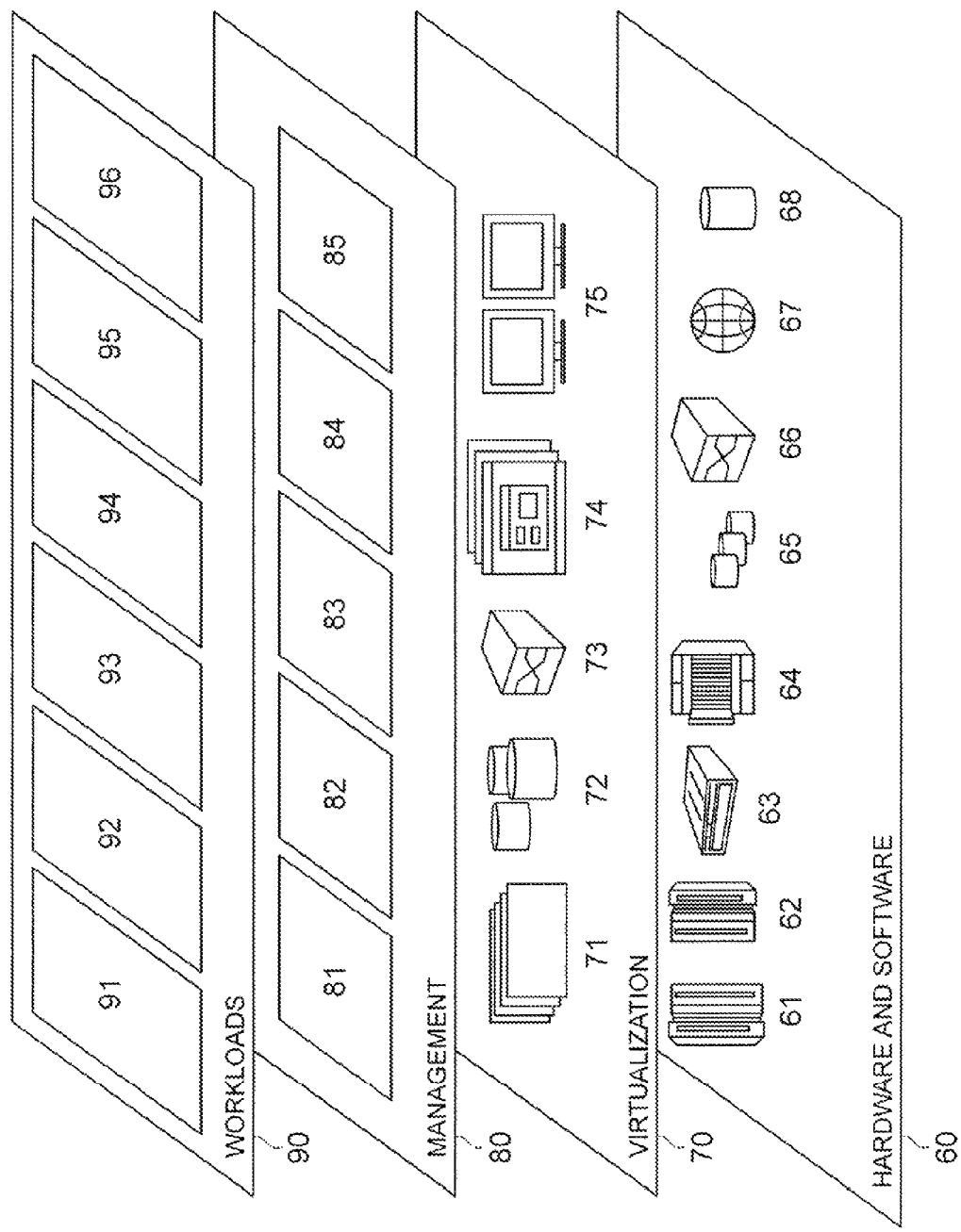
FIG. 11 depicts abstraction model layers according to an embodiment.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 12:
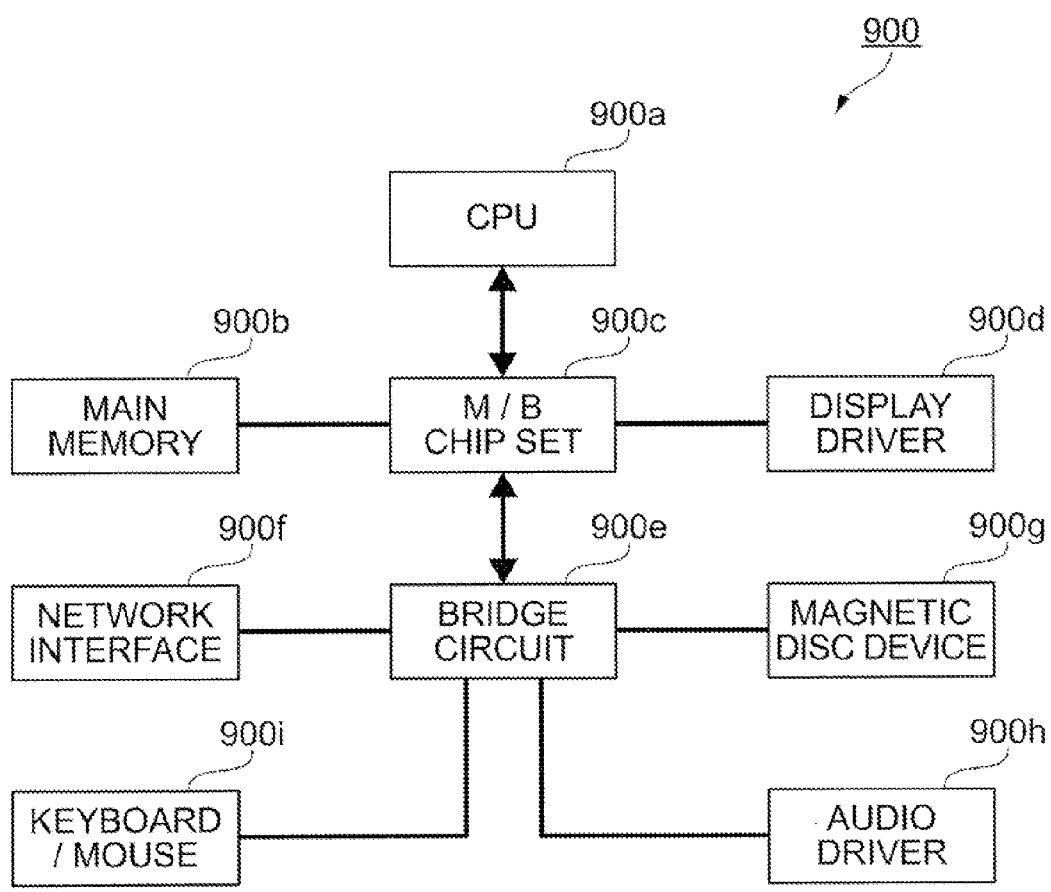
FIG. 12 is a diagram showing an example of a hardware configuration of a computer able to implement the embodiment.

Referring to FIG. 12, there is shown an example of a hardware configuration of a computer 900 able to implement the exemplary embodiments. As shown in the figure, the computer 900 may include a central processing unit (CPU) 900a serving as one example of a processor, a main memory 900b connected to the CPU 900a via a motherboard (M/B) chip set 900c and serving as one example of a memory, and a display driver 900d connected to the CPU 900a via the same M/B chip set 900c. A network interface 900f, magnetic disk device 900g, audio driver 900h, and keyboard/mouse 900i are also connected to the M/B chip set 900c via a bridge circuit 900e.

In FIG. 12, the various configurational elements are connected via buses. For example, the CPU 900a and the M/B chip set 900c, and the M/B chip set 900c and the main memory 900b are connected via CPU buses, respectively. Also, the M/B chip set 900c and the display driver 900d may be connected via an accelerated graphics port (AGP). However, when the display driver 900d includes a PCI express-compatible video card, the M/B chip set 900c and the video card are connected via a PCI express (PCIe) bus. Also, when the network interface 900f is connected to the bridge circuit 900e, a PCI Express may be used for the connection, for example. For connecting the magnetic disk device 900g to the bridge circuit 900e, a serial AT attachment (ATA), a parallel-transmission ATA, or peripheral components interconnect (PCI) may be used. For connecting the keyboard/mouse 900i to the bridge circuit 900e, a universal serial bus (USB) may be used.

Here, the present invention may be realized using all hardware or all software. It can also be realized using a combination of both hardware and software. The present invention may also be realized as a computer, data processing system, or computer program product. The computer program product may be stored and distributed on a non-transitory computer-readable medium. Here, the medium may be an electronic, magnetic, optical, electromagnetic, infrared, or semiconductor system (device or equipment), or a transmission medium. Examples of the non-transitory computer-readable medium include semiconductors, solid-state storage devices, magnetic tape, removable computer diskettes, random-access memory (RAM), read-only memory (ROM), rigid magnetic disks, and optical disks. Examples of optical disks at the present time include compact disk read-only memory (CD-ROM) disks, compact disk read/write (CD-R/W) disks, and DVDs.

The present invention has been explained above using an embodiment, but the technical scope of the present invention is not limited in any way by this exemplary embodiment. It should be clear to a person of skill in the art that various modifications and substitutions can be made without departing from the spirit and scope of the present invention.

What is claimed is:

1. A computer-implemented method for computing an intersection or an intersection cardinality of each pair of a set in a first list of a plurality of sets and a set in a second list of a plurality of sets, the method comprising:
    calculating a first union of a predetermined number of sets in the first list;
    obtaining filtered sets of the second list by filtering out an element from the plurality of sets in the second list, the element being not included in the first union; and
    intersecting a set in the first list and a set in the filtered sets of the second list.

2. The method according to claim 1, wherein the predetermined number of sets is proportional to $(|D|/|C|)^{1/2}$, where $|D|$ represents a number of all possible elements of each set, and $|C|$ represents the size of the largest set among the predetermined number of sets or the size of a set having an average size in the predetermined number of sets.

3. The method according to claim 2, wherein the sets in the first list are listed in the order of size, and the predetermined number of sets are selected in order from the beginning of the first list.

4. The method according to claim 1, wherein the predetermined number of sets is selected such that the size of the first union is smaller than the number of all possible elements of each set and larger than the size of each set.

5. The method according to claim 1, wherein the intersecting a set in the first list and a set in the filtered sets of the second list is performed on condition that the size of the first union is a predetermined size and over.

6. A computer-implemented method for computing an intersection or an intersection cardinality of each pair of a set in a first list of a plurality of sets and a set in a second list of a plurality of sets, the method comprising:
    calculating a first union of a predetermined number of sets in the first list;
    obtaining filtered sets of the second list by filtering out an element from the plurality of sets in the second list, the element being not included in the first union;
    calculating a second union of a predetermined number of sets in the second list;
    obtaining filtered sets of the first list by filtering out an element from the plurality of sets in the first list, the element being not included in the second union; and
    intersecting a set in the filtered sets of the first list and a set in the filtered sets of the second list.

7. The method according to claim 6, wherein the sets in the first list and the sets in the second list are respectively listed in the order of size and the predetermined number of sets in the first list and the predetermined number of sets in the second list are respectively selected in order from the beginning of the first list and from the beginning of the second list.

8. The method according to claim 6, wherein intersecting a set in the filtered sets of the first list and a set in the filtered sets of the second list is performed on condition that the size of the first union is a predetermined size and over and the size of the second union is a different predetermined size and over.

9. A system for computing an intersection or an intersection cardinality of each pair of a set in a first list of a plurality of sets and a set in a second list of a plurality of sets, the system comprising a processor and a memory coupled to the processor, wherein the memory comprises instructions which, when executed by the processor, cause the processor to:
    calculate a first union of a predetermined number of sets in the first list;
    obtain filtered sets of the second list by filtering out an element from the plurality of sets in the second list, the element being not included in the first union; and
    intersect a set in the first list and a set in the filtered sets of the second list.

10. The system according to claim 9, wherein the predetermined number of sets is proportional to $(|D|/|C|)^{1/2}$, where $|D|$ represents a number of all possible elements of each set, and $|C|$ represents the size of the largest set among the predetermined number of sets or the size of a set having an average size in the predetermined number of sets.

11. The system according to claim 10, wherein the sets in the first list are listed in the order of size, and the predetermined number of sets are selected in order from the beginning of the first list.

12. The system according to claim 9, wherein the predetermined number of sets is selected such that the size of the first union is smaller than the number of all possible elements of each set and larger than the size of each set.

13. The system according to claim 9, wherein the memory comprises instructions which cause the processor to intersect a set in the first list and a set in the filtered sets of the second list on condition that the size of the first union is a predetermined size and over.

* * * * *